United States Patent [19]

Linnman

[11] 4,021,720
[45] May 3, 1977

[54] SWITCHING DEVICE FOR THE CONTROL OF, AND REDUCTION OF POWER LOSSES AND RADIO DISTURBANCES ASSOCIATED WITH CIRCUITRY, COMPRISING ONE OR MORE SWITCHING MEMBERS LOADED BY AN INDUCTANCE

[75] Inventor: Sven N. J. Linnman, Akers Runo, Sweden

[73] Assignee: Per Udden AB, Akers Runo, Sweden

[22] Filed: Apr. 1, 1975

[21] Appl. No.: 564,083

[30] Foreign Application Priority Data
Apr. 5, 1974 Sweden .......................... 74046343

[52] U.S. Cl. .................................. 321/44; 321/18
[51] Int. Cl.² ........................................ H02M 7/537
[58] Field of Search ............... 307/240, 253; 321/2, 321/10, 18, 43, 44, 16

[56] References Cited

UNITED STATES PATENTS

| | | | |
|---|---|---|---|
| 3,090,017 | 5/1963 | Novic | 321/10 X |
| 3,229,150 | 1/1966 | Greep et al. | 307/253 X |
| 3,229,194 | 1/1966 | Mills | 307/240 X |
| 3,235,841 | 2/1966 | Bauwens | 307/253 X |
| 3,621,361 | 11/1971 | Barth | 321/2 |
| 3,621,363 | 11/1971 | Linnman et al. | 321/2 |

OTHER PUBLICATIONS

IBM Technical Disclosure Bulletin, "DC to DC Converter," J. C. Briot, vol. 10, No. 10, Mar. 1968.

*Primary Examiner*—William M. Shoop
*Attorney, Agent, or Firm*—Cushman, Darby & Cushman

[57] ABSTRACT

An arrangement for controlling the current in a circuit having a source of current connected with an inductive device and a load. A switching member is provided in the circuit, this member being controlled between on and off conditions by a triggering element joined to a series circuit which includes the inductive member, an additional inductance and a control member. The control member establishes the rate at which the additional inductance becomes saturated when the switching member is turned off. The state of saturation is employed to operate the switching member thereby controlling current flow to the load.

17 Claims, 12 Drawing Figures

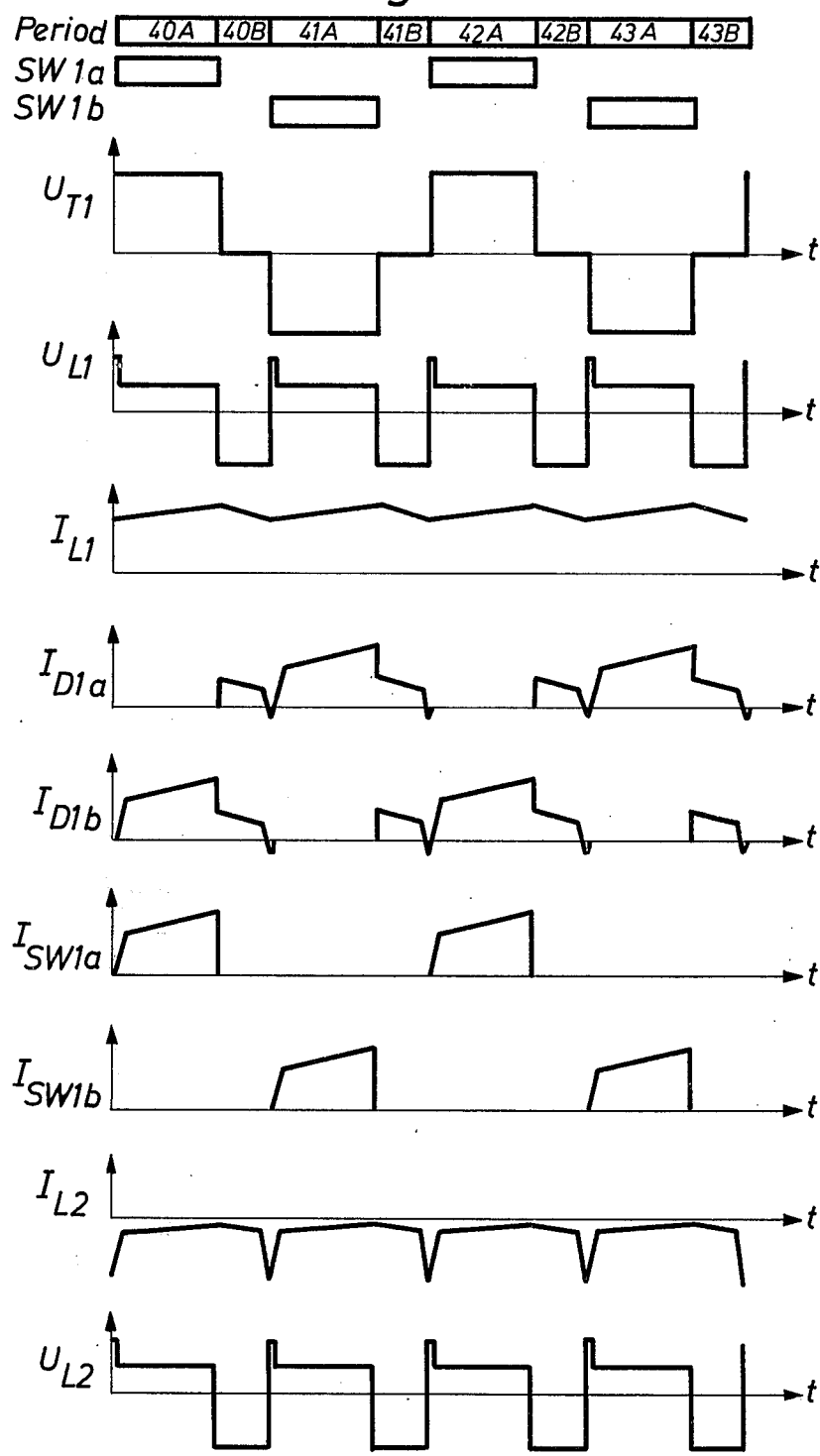

SWITCHING DEVICE FOR THE CONTROL OF, AND REDUCTION OF POWER LOSSES AND RADIO DISTURBANCES ASSOCIATED WITH CIRCUITRY, COMPRISING ONE OR MORE SWITCHING MEMBERS LOADED BY AN INDUCTANCE

A switching device according to the invention is intended to complete known circuitry, such as switched regulators, inverters, frequency converters, and commutator transformers. Such circuitry can be used in conjunction with apparatus of various kinds, for instance battery chargers, electric power supply units, electric welding equipment, and for control of direct-current motors.

It is a characteristic feature of such circuitry that it comprises at least one periodically making and breaking switching member, which is loaded by an inductive member either directly or indirectly by way of a transformer. When the switching member is cut out the current, which is then conveyed by the inductive member, is conducted through one or more so-called freewheel diodes or rectifier diodes. When the switching member or one of the switching members is cut in, at least one of these diodes becomes biased in the reverse direction. Under practical conditions, however, a diode does not block immediately but permits the passage of current in the reverse direction during the so-called recovery time. This implies that a strong pulse of current will flow through at least one diode and one switching member, immediately following the cut-in of the switching member and lasting until the recovery of the diode(s) has occurred. Such pulses of current cause energy losses both in the diode(s) and switching members and produce radio disturbances. The pulses can be eliminated by means of a switching device as described in U.S. Pat. No. 3,621,363. However, a switching device according to the said patent presupposes the presence of a transformer core with superposed magnetization, and the appliances required to produce such magnetization demand much power and space.

With a switching device according to the present invention the harmful pulse of current can be eliminated without resorting to superposed magnetization of the transformer core. This system offers considerable advantages in the form of a 40 percent reduction of the over-all core and copper volume and an approximately 50 percent reduction of the power loss. These advantages follow, inter alia, from the complete elimination in a switching device according to the invention of the inductance coil, which is used for smoothing the superposed magnetization current according to the U.S. patent. The present invention also avoids the iron and copper losses that occur in a transformer according to the U.S. patent when the transformer operates at saturation. The advantages described are realized in a device that is characterized mainly by an inductance coil's loading the inductive member by a load power that at the beginning of the half-period during which the switching member or members are cut out, is much less than the power delivered by the inductive member at that time, the load power then becoming equal to or greater than the power delivered by the inductive member at the end of the said half-period. The current through the diode(s) ceases or changes its direction at the end of the half-period, thus enabling the diode(s) to recover and block the passage.

Following blockage by the diode(s), the switching member(s) can be cut in without causing any pulse of current as described. This generally implies a reduction by one-half of the over-all power loss of the switching device and also a considerable reduction in the price of the said switching members and diodes. As the radio disturbances by the switching device diminish notably the costs of noise filters can also be reduced or eliminated.

The switching device according to the invention can also be used for controlling the circuitry known from the above mentioned U.S. patent. This is achieved by forming a closed series circuit comprising a control member (F1, F2, F3), the above mentioned inductance member and a winding enclosing the magnetic circuit of the above mentioned inductive member. Utilizing potentials generated across the control member, the magnetization of the inductance coil is shifted relative to that of the inductive member, causing a change in the output of the known switching device.

Certain embodiments of the invention, which have been chosen as examples, are described below, reference being made to the appended illustrations, of which FIG. 1 shows a circuit diagram of a simple switching regulator according to the invention;

Figure 1:
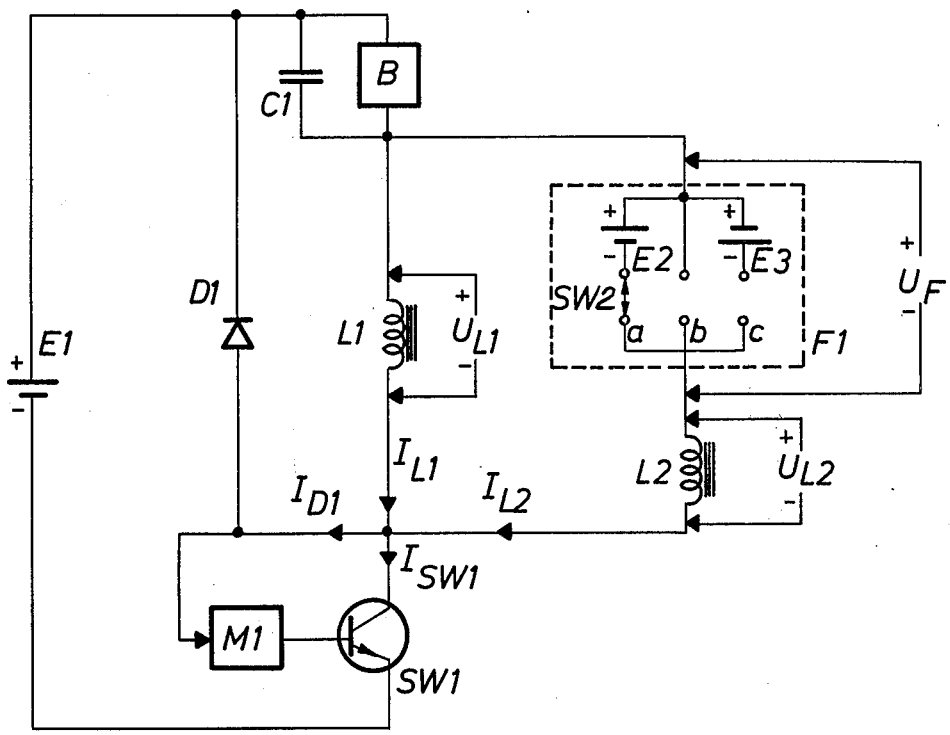
Figure 6:
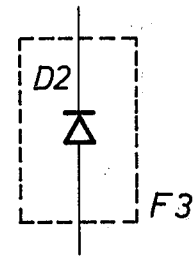
Figure 7:
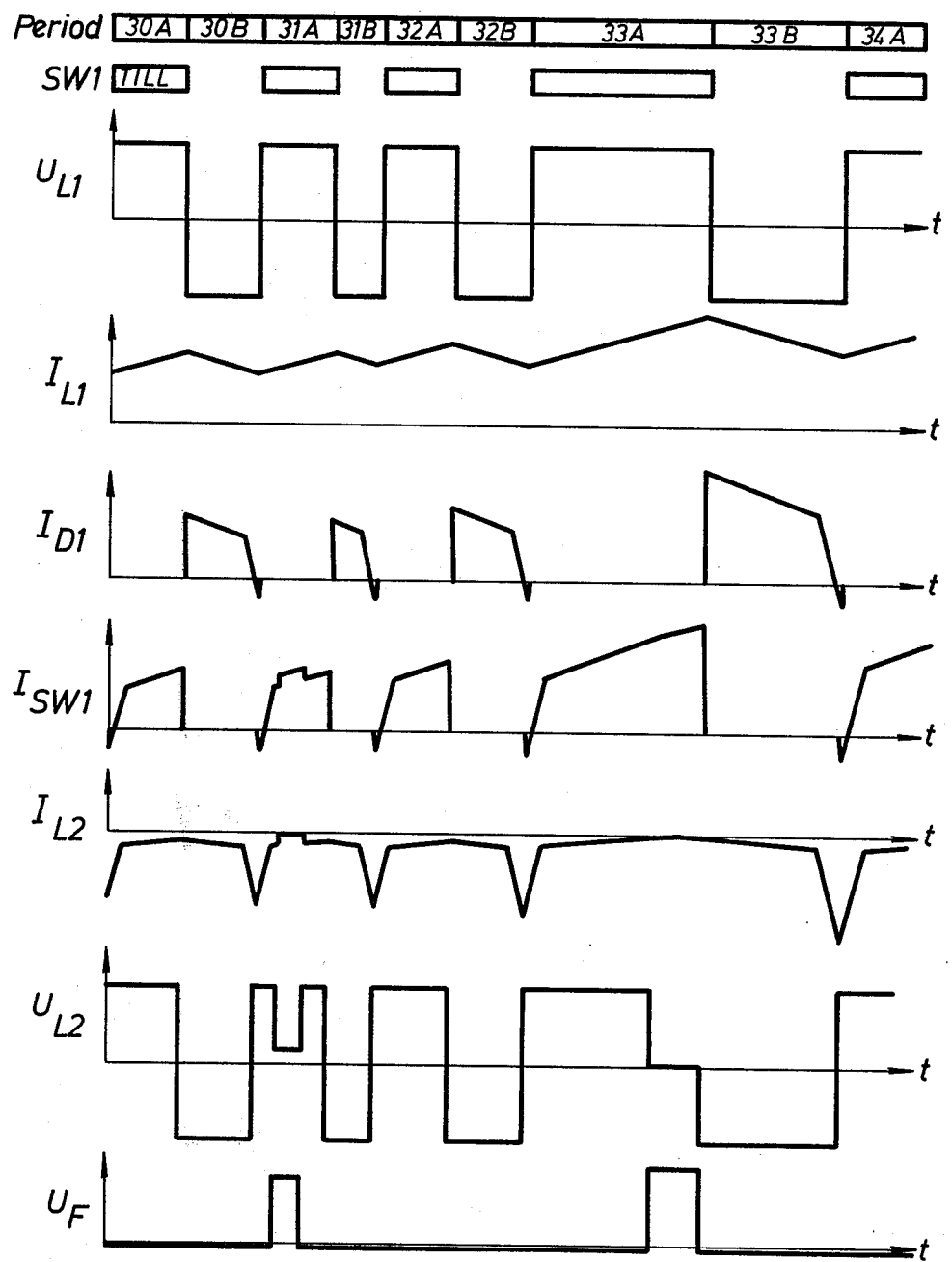
Figure 8:
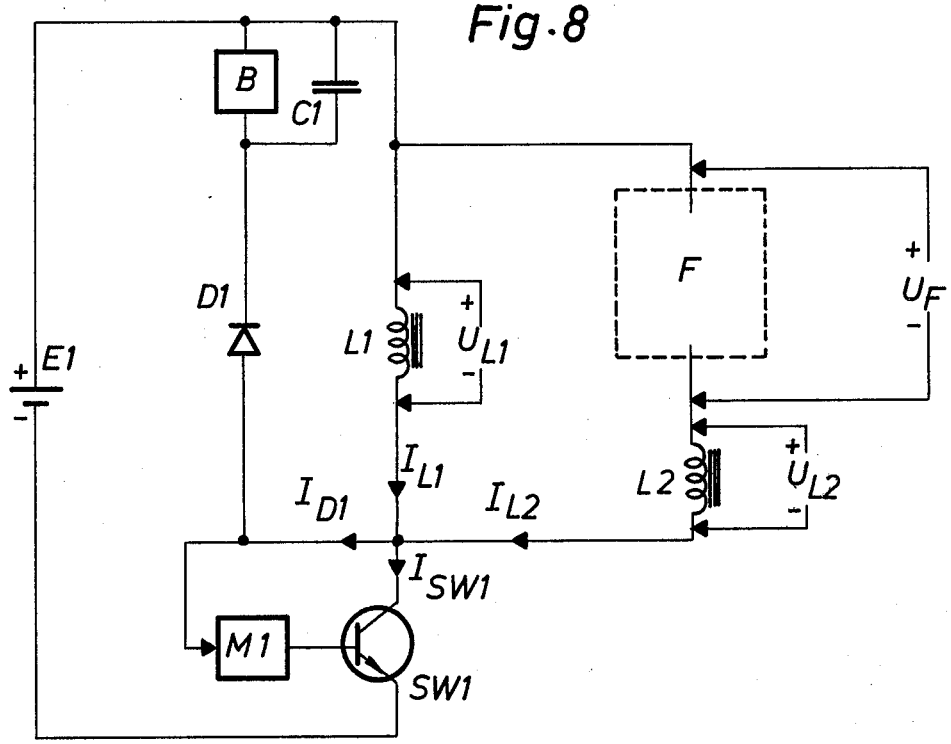
Figure 9:
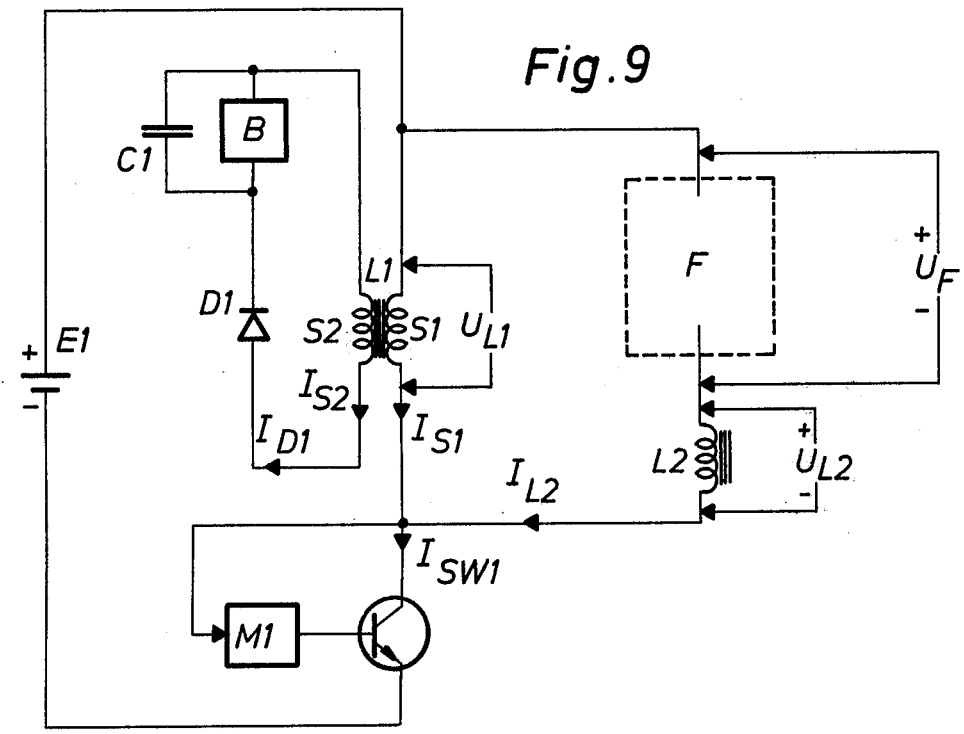
Figure 10:
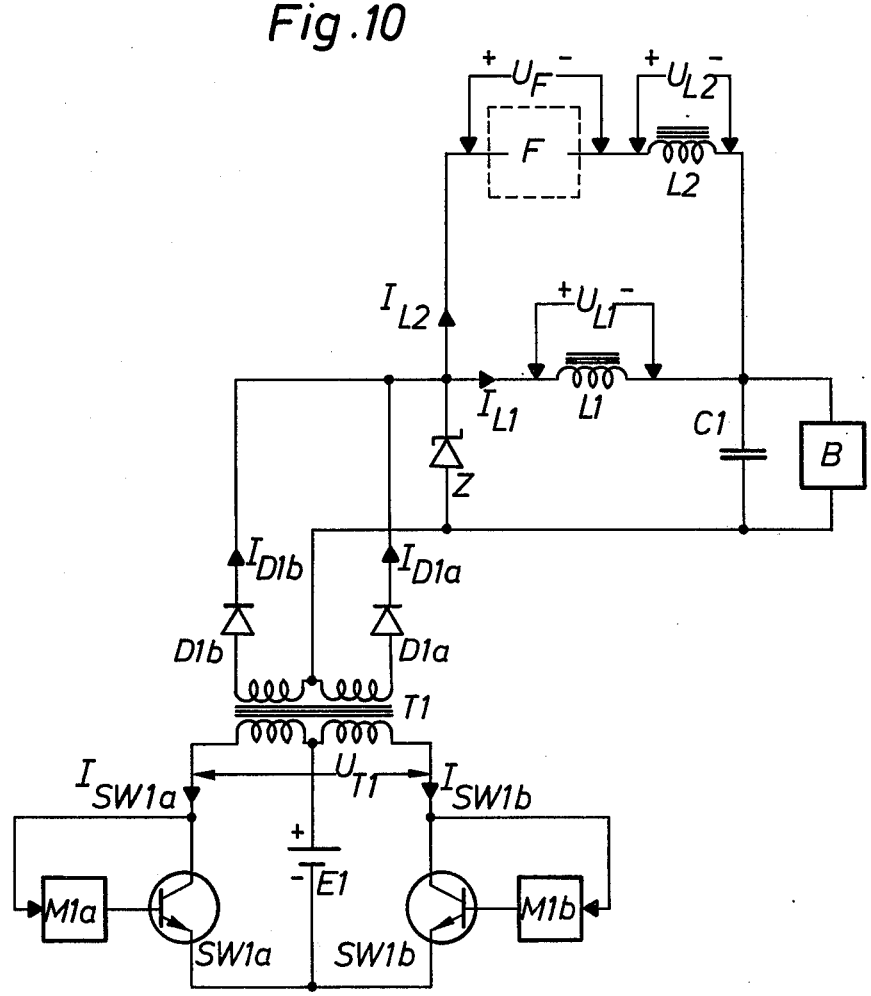

FIG. 6 displays another alternative embodiment of a control member that is intended to be used in conjunction with the switching regulator depicted in FIG. 1;

FIG. 7 shows time diagrams of the potentials and currents obtained with the alternative embodiment depicted in FIG. 6;

FIG. 8 illustrates another embodiment of a switching regulator / potential transformer according to the invention;

FIG. 9 shows an alternative embodiment of the switching regulator / potential transformer illustrated in FIG. 8;

FIG. 10 shows a push-pull type potential transformer;

FIG. 11, finally, shows time diagrams of the potentials and currents indicated in FIG. 10.

For a detailed examination of the functioning of a switching device according to the present invention we have chosen to let it complement the simplest form of switching regulator as shown in FIG. 1. The behaviour with respect to time of the potentials and currents indicated in FIG. 1 can be seen from FIG. 2.

The switching member SW1 in this switching device is loaded by the inductance L1 and the load B. Being loaded inductively in part, the switching member has to be protected against overvoltages by means of the freewheel diode D1. The inductance L1 and the capacitance C1 are incorporated to smooth the current fed pulsewise to the load B. To facilitate an investigation of the function the load B chosen in this case has such a characteristic that the potential across B will not increase when the current through B increases. B may consist, for instance, of an accumulator.

The inductive portion of the load on the switching member, the inductance L1, is connected in parallel with a switching device according to the invention. This consists of the sources of potential E2 and E3 and the switch SW2 by means of which various potentials $U_F$ (cf. FIG. 1) can be generated, and of the inductance coil L2.

The switch SW2 is first set in position a. The operating cycle of the switching device is started by the closing of the switching member SW1 (period 1A in FIG. 2) during a period of time that is determined by the monostable toggle switch M1. The switching member in this case is a transistor. While the switching member is closed, energy is fed to the load B from the source of potential E1, mainly by the inductance L1. Some current also flows through the source of potential E2 and the inductance coil L2 but this current is slight, owing to the high inductance of L2.

Period 1B starts when the switching member SW1 opens. The energy stored in the inductance L1 makes the potential across the switching member SW1 positive so that the diode D1 is biased in the forward direction and becomes conductive. The current through the diode diminishes down to zero and then passes in the reverse direction through the diode until this has recovered and blocks the passage. The total of $I_{L1}$ and $I_{L2}$ being negative when the diode is blocking, the potential across the switching member is forced towards zero. This potential reduction triggers the monostable toggle switch M1 and a new period (period 2) is initiated. The functioning of the switching device is obviously about the same as that of a conventional switching regulator.

Figure 2:
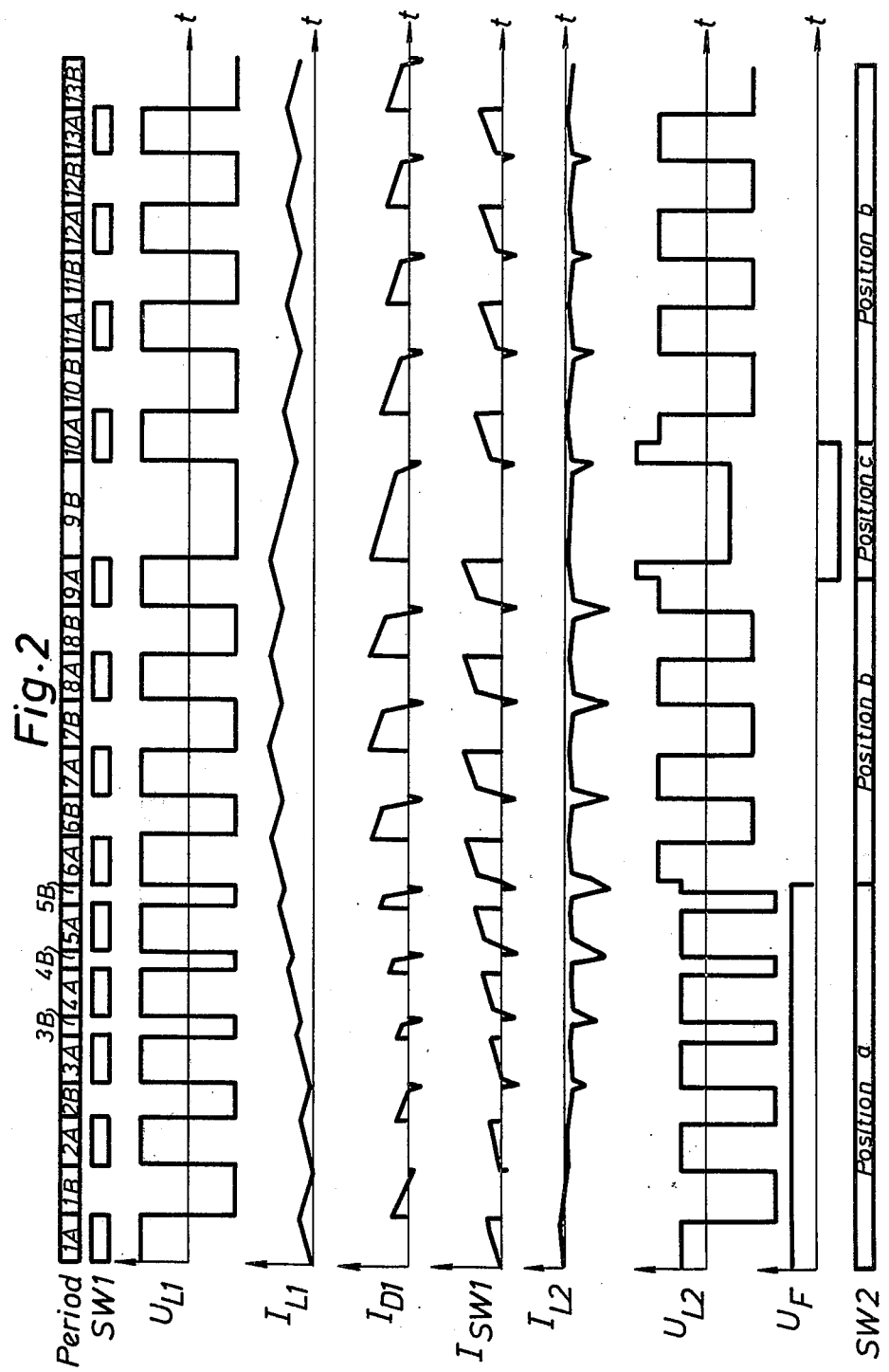
FIG. 2 shows diagrams of the potentials and currents indicated in FIG. 1.

The alternating potential that occurs across the inductance coil L2 is, however, superposed by a direct potential $U_F$ as can be seen in FIGS. 1 and 2. This direct potential slowly displaces the current curve $I_{L2}$ of the inductance coil L2 downwards as is shown in FIG. 2. During period 2B this shift becomes so great that the core of the inductance coil L2 is saturated, causing a considerable reduction of the inductance of L2. The current fed to the diode D1 consequently becomes so loaded by the inductance coil L2 that the current through the diode soon changes its direction after which the diode blocks the passage, and a new period (period 3) starts. The half-period 2B consequently is shorter than the half-period 2A as can be seen from FIG. 2. The same state of things also prevails during periods 3 – 6. Since the positive half-periods, whose lengths are determined by the monostable toggle switch M1, are longer than the negative ones the mean current $I_{L1}$ through the inductance L1 increases. There is also an increase in the current through the load B.

In period 6 the switch SW2 is set in position b. The potential $U_F$ becomes zero and the downward displacement of the current $I_{L2}$ is interrupted. The following periods 7 and 8 now become identical. The switching device continues to feed a constant power to the load as long as the switch SW2 remains in position b.

To produce a reduction of the current fed to the load the switch SW2 is set in position c during period 9A. This brings about a potential $U_F$ of a polarity opposite to that obtained when the current fed to the load was being increased. The course of events also is the opposite. The current curve $I_{L2}$ gradually becomes displaced upwards. The current $I_{L2}$ thus abates less steeply during period 9B and it takes a longer time for the inductance coil L2 to become saturated and reverse the direction of the current through the diode D1. The negative half-period 9B, consequently, is longer than the constant, positive half-periods. As a consequence there is a drop in the mean value of $I_{L1}$. The current fed to the load B thus diminishes. In period 10A the switch SW2 is returned to position b, making the subsequent periods identical.

It is easy to see that the change in the current fed to the load depends on the duration and amplitude of the potential $U_F$ and also that such changes in $U_F$ can be made at any point of time.

It has now been shown that the output current of the switching device and, hence, its output power can be controlled by means of a potential $U_F$.

We shall now demonstrate a few methods of generating and varying this potential.

Figure 3A:
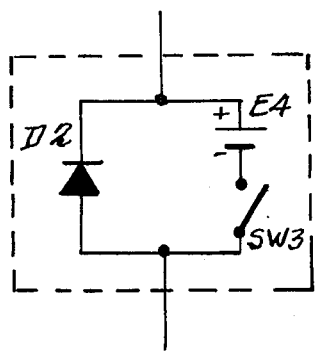
FIGS. 3A to 3C show alternative embodiments of a control member that are intended to be used in conjunction with the switching regulator depicted in FIG. 1.

By substituting a device F2 according to FIG. 3A for the block F1 in FIG. 1 the control voltage $U_F$ may be varied by means of a switching member SW3. When this switching member is cut out the current $I_{L2}$ passes through the diode D2. The potential drop in the forward direction typical of diodes in general, causes a negative potential $U_F$ that diminishes the output of the device according to the principles demonstrated previously. Under practical conditions the potential drop that occurs across the unavoidable resistances in the closed series circuit comprising the inductance L1, the coil L2 and a block F, will also reduce the output power. When the switching member SW3 is cut in, the diode D2 becomes biased in the reverse direction and blocks the passage, causing the potential across the source of potential E4 to generate a positive potential $U_F$, which makes the output of the switching device increase.

By alternately cutting in and cutting out the switching member SW3 the output of the switching device can be maintained at a mainly constant level.

Figure 5:
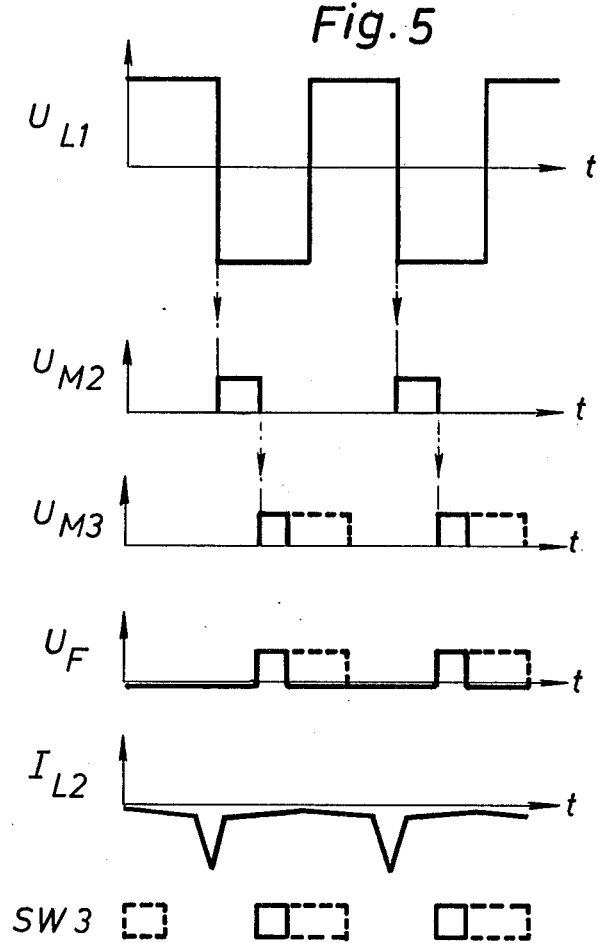
FIG. 5 shows time diagrams of the potentials and currents indicated in FIGS. 4 and 1.
Figure 4:
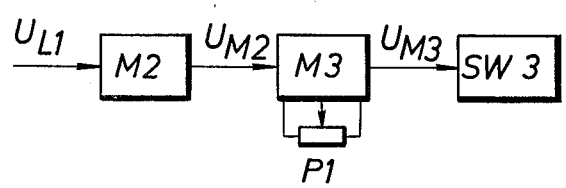
FIG. 4 shows a device for controlling the switch SW3 according to FIG. 3.

According to the invention the switching member SW3 is cut in only during those parts of the operating cycles of the switching device when the current through the inductance coil L2 is weak. Since the switching member SW3 need only be sized to suit these weak currents it can be manufactured at low cost. This mode of operation can be achieved for instance by an arrangement according to FIGS. 4 and 5. The potential $U_{L1}$ across the inductance L1 is sensed by the monostable toggle switch M2. The negative slopes of $U_{L1}$ trigger the toggle switch the output of which becomes positive during a period of 0.25T where T = the period length of the switching device. The negative slope of the M2 output triggers the monostable toggle switch M3 the pulse duration of which can be varied within the range 0 – 0.5T by means of the potentiometer P1. During the pulse duration of the toggle switch M3 the switching member SW3 is cut in according to FIG. 3A. As can be seen from the time diagram in FIG. 5 the switch member SW3 will be cut in only when the current $I_{L2}$ is weak; and this is the actual purpose of the arrangement. Furthermore, the output of the switching device can be controlled by the potentiometer P1 since the mean value of the potential $U_F$ varies according to the setting of the potentiometer.

According to the invention a varying potential $U_F$ can be set up across a diode D2 connected serially with the inductance coil L2 also in another few ways that will now be described. To this end the block F1 in FIG. 1 is replaced by a block F3 according to FIG. 6. FIG. 7 demonstrates the behaviour of currents and potentials with respect to time as indicated in FIG. 1. In the main the system functions as described previously. The differences will be clear from the following description.

FIG. 7 shows the course in relation to time when the switching device has been in operation for a number of periods. During period 30, only a weak negative potential $U_F$ is produced, owing to the potential drop of the diode D2 in the forward direction. Hence, the output power of the device during this period shows a slight drop. In period 31A, however, the inductance coil L2 is connected temporarily in parallel with a load, such as a resistance. This implies a heavy load on the coil, causing the potential across it to drop and the diode D2 to block the passage. A positive potential $U_F$ then arises across the diode D2, causing an increase in the output of the switching device. It is thus possible to control the output of the switching device by loading the inductance coil L2. The same result is achieved by applying the load by means of a separate winding on the coil L2.

If the pulse duration of the monostable toggle switch M1 in FIG. 1 is made variable while the block F is replaced as indicated in FIG. 6 the output power of the switching device can be increased by still another method.

By changing the pulse duration of the monostable toggle switch M1 the half-period 33A (cf. FIG. 7) can be prolonged. Such a duration is imparted to the half-period as to allow the current $I_{L2}$ through the coil 12 to reverse its direction. This biases the diode D2 in the reverse direction and causes it to block the passage. There will thus be a positive pulse of potential $U_F$ across the diode D2, increasing the output of the switching device. The duration of the pulse of potential is dependent upon the pulse duration of the monostable toggle switch M1. The output power of the switching device can thus be controlled by the pulse duration of the monostable toggle switch M1, i.e., by varying the length of time during which the switching member SW1 is cut in.

If a potential is generated across the diode D2 either by making the conductive period of the switching device long or by connecting the inductance coil L2 and a load in parallel this potential can be short-circuited for a long or short time by a switching member in parallel with the diode. Hence, the controlling potential $U_F$ can also be varied by means of a switching member in parallel with the diode D2.

Figure 3B:
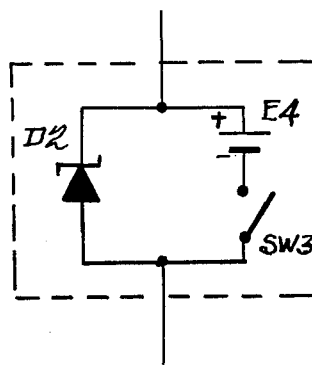
Figure 3C:
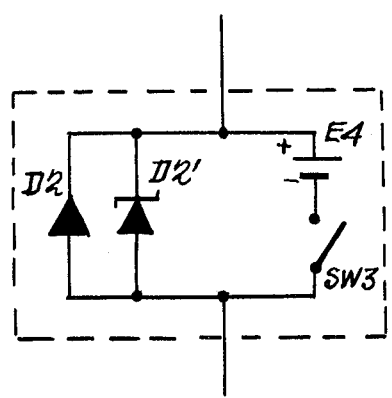

The diode D2 according to the invention may be of the zener type, or it may be connected in parallel with a zener diode D2', for the purpose of limiting the potential $U_F$ to a certain value. Such arrangements are illustrated in FIGS. 3B and 3C, respectively.

As can be seen there are many possibilities of controlling the output of a switching device complemented according to the invention, and the preceding paragraphs have provided only a few examples. The controlling methods described may also be combined with each other.

A switching device according to the invention does not require any galvanic connection with the conventional switching device which it complements but may be joined without functional impairment with a separate winding around the same magnetic circuit as that enclosed by the inductance L1.

The inductance coil L2 in a switching device according to the invention need not be sized in such a way as to become saturated at the end of the half-period when the switching member is cut out. At a sufficiently low coil inductance the current $I_{L2}$ through the inductance coil will have enough time at the end of the half-period during which the switching member is cut out, to become stronger than the current $L_{L1}$ produced by the inductance L1 so that the diode D1 will block the passage. The mean current through the inductance coil L2 will, however, be stronger in this case, which causes disadvantages for instance in the form of greater losses in the coil L2.

The switching member SW1 or inductance L1 in the conventional switching device may very well be connected in parallel with a condenser while retaining its function as a complement according to the invention. The use of a condenser will bring about a further reduction of the radio disturbances and will diminish the cut-out losses in the switching member.

We have now provided a detailed study of the various principles of function and control applicable when a switching device according to the invention is used to complement a simple conventional switching regulator. These principles may also be applied to any of the various types of known switching devices in which a switching member is loaded inductively. A few examples will be given to facilitate application in such cases.

FIG. 8 shows a type of switching regulator / potential transformer in which the current fed to the load is obtained from the rectifier diode (or free-wheel diode) D1. Also in this example the course of the currents and potentials in FIG. 8 with respect to time is described by FIGS. 1 and 7. As can be seen from FIGS. 1 and 7 the current $I_{D1}$, which in these examples is the current fed to the load, will also, on an average, increase and decrease as the current $I_{L1}$, which was the current fed to the load in the previous example, increases and decreases, respectively. The principles of controlling the input to the load thus remain valid even in this case.

FIG. 9 demonstrates a potential transformer of the so-called return type, which is closely related to the potential transformer in FIG. 8, the only difference being that the inductance L1 in FIG. 8 has been provided with an additional winding S2 in FIG. 9 in order to separate the source of current and the load galvanically from each other. The curves in FIGS. 1 and 7 still apply, yet with the addition that the current $I_{L1}$ in FIGS. 1 and 7 is the total of $I_{S1}$ and $I_{S2}$ as indicated in FIG. 9.

As compared to the potential transformers described in U.S. Pat. No. 3,621,363 a potential transformer according to FIG. 9 offers great advantages in the form of a reduction of the total core and copper volume by at least 40 percent and a reduction of the power losses amounting to about 50 percent. These advantages ae attributable in part to the inductance coil L20 incorporated in the U.S. patent for smoothing the biasing current, being completely avoided in a switching device according to the present invention. Also, the iron and copper losses occurring in a transformer T1 according to the above mentioned U.S. patent when the transformer becomes saturated, are avoided.

The contribution by the inductance coil L2 in a switching device according to the invention with respect to over-all power loss and weight is insignificant as the average current through the coil L2 relative to the current through the coil L20 incorporated in the U.S. patent is very weak, enabling the inductance coil L2 to be made very small.

FIG. 10 shows a push-pull type potential transformer in which two switching members SW1a and SW1b are conductive alternately. The alternating potential generated is transformed by the transformer T1 and rectified by the diodes D1a and D1b. The pulsating direct potential is smoothed by the inductance L1 and the condenser C1 before reaching the load B. During those periods of time in which neither of the switching members SW1a and SW1b is conductive the diodes D1a and D1b act as free-wheel diodes for the inductance L1. In a switching device as described the switching members SW1a and SW1b are loaded indirectly, by way of the transformer T1, and inductively by the inductance L1. The switching device according to the present invention can thus in this example be connected in parallel with the inductance L1.

The switching device according to the present invention operates in accordance with the same basic principles as described previously, which can be seen from the time diagram in FIG. 11 in which these currents and potentials correspond to the indications in FIG. 10.

In the period 40A (cf. FIG. 11) the switching member SW1a is conductive during a period of time that is determined by the monostable toggle switch M1a. This causes the induction of a positive potential $U_{T1}$ across the transformer windings T1. This potential is transferred to the load by way of the diode D1a and the inductance L1. During the period 40B both switching members block the passages, and the current $L_{L1}$ passing through the inductance L1 is distributed between the diodes D1a and D1b. At the end of the period the inductance coil L2 becomes saturated and takes over the current through the inductance L1. The currents $I_{D1a}$ and $I_{D1b}$ through the diodes then diminish and change their directions after which the diodes block the passages. The potential across the inductance L1 then becomes strongly positive but is limited in this case by the zener diode Z. With a strong magnetizing current of the transformer T1 the diode D1a alone would block the passage and there would be no need for the protective diode Z.

When both the diodes D1a and D1b or diode D1a alone blocks the passage the magnetizing current for the transformer T1 will force the potential across the transformer $U_{T1}$ to become negative. This implies that the potential across the switching member SW1b will be weak, which is sensed by the monostable toggle switch M1b. This switch then makes the switching member conductive for a certain period of time, and another half-period starts. During this half-period the switching member SW1b and the diode D1b are conductive but the principle of operation remains the same as during the previous period in all other respects.

According to the present invention two or more switching devices when complemented according to the invention can be connected to the same source of potential or the same load or both. If the switching devices operate at a phase shift or at different frequencies the load on the smoothing filters at the input or output or both will be less, enabling the size and price of the filters to be reduced. The phase shift and the various frequencies may be entirely random or they may be positively controlled in accordance with techniques already known.

What is claimed is:

1. A switching device for controlling current flow in a circuit having a current source, a first inductive member, a load, and a switching member which supplies current from said source to the first inductive member when said switching member is conductive, said circuit being arranged to permit current to be supplied to the load from the first inductive member when the switching member becomes nonconductive, said switching device comprising:
a series circuit which includes said first inductive member, a second inductive member and a control member; and triggering means electrically connected between said series circuit and said switching member, said triggering means being responsive to the state of saturation of said second inductive member for controlling the conduction of said switching member.

2. A switching device according to claim 1 wherein said control member includes means for producing a voltage there-across for controlling the rate of saturation of said second inductive member.

3. A switching device according to claim 2 wherein said voltage producing means includes a diode.

4. A switching device according to claim 3 wherein said diode is a zener diode.

5. A switching device according to claim 3 wherein said diode is connected in parallel with a zener diode.

6. A switching device according to claim 3 wherein said diode is connected in parallel with a series connection of a voltage source and an additional switching member.

7. A switching device according to claim 1 wherein said first inductive member comprises a pair of transformer-coupled windings, one of said windings being connected to the current source and the switching member and also comprising a portion of said series circuit, the other of said windings being connected to said load.

8. A switching device according to claim 1 wherein said switching member comprises a pair of switches connected across said current source and joined to the first inductive member and said load by a push-pull transformer connection.

9. A switching device according to claim 8 wherein said control member includes means for producing a voltage there-across for controlling the rate of saturation of said second inductive member.

10. A switching device according to claim 9 wherein said voltage producing means includes a diode.

11. A switching device according to claim 10 wherein said diode is a zener diode.

12. A switching device according to claim 10 wherein said diode is connected in parallel with a zener diode.

13. A switching device according to claim 10 wherein said diode is connected in parallel with a series connection of a voltage source and an additional switching member.

14. A switching device for controlling the current flow from a current source through at least one switching member to a first inductive member, said switching member in its conductive state permitting current to be supplied to said first inductive member storing the main part of energy supplied from said current source,
a first series circuit including said first inductive member, a second inductive member and a control member capable of generating a DC current component in order to magnetize said second inductive member into saturation,
a second series circuit including said first inductive member and a load,
said first inductive member discharging the stored energy during a time period when said switching member is in its non-conductive state, thereby generating a current through the load and the second inductive member, said control member being arranged to generate a DC current component in order to magnetize said second inductive member into saturation at a certain time during said time period when the total current generated by said first inductive member and said control member has reached the point of saturation of said second inductive member, whereby the load effect stored in said second inductive member during said time period and before said certain time being substantially less than the effect discharged by said first inductive member, while the load effect stored in said second inductive member during said time period but after said certain time being increased so that at the end of said time period the effect stored in said second inductive member will be at least the same as the effect discharged by said first inductive member.

15. A switching device according to claim 14 wherein said control member includes means for producing a voltage there-across for controlling said DC current component.

16. A switching device according to claim 14 wherein said first inductive member comprises a pair of transformer-coupled windings, one of said windings being connected to the current source and the switching member and also comprising a portion of said first series circuit, the other of said windings being connected to said load.

17. A switching device according to claim 14 wherein said switching member comprises a pair of switches connected across said current source and joined to the first inductive member and said load by a push-pull transformer connection, and wherein said control member includes means for producing a voltage there-across for controlling said DC current component.

* * * * *